May 20, 1958 — W. SUHNER — 2,835,497

LOCKING DEVICE FOR SPINDLES

Filed June 14, 1955

2,835,497

LOCKING DEVICE FOR SPINDLES

Willy Suhner, Brugg, Switzerland

Application June 14, 1955, Serial No. 515,493

Claims priority, application Switzerland June 18, 1954

2 Claims. (Cl. 279—42)

The present invention relates to a locking device for tightening spindles provided with a collet chuck end in hand tools.

The holding of such spindles during unscrewing or tightening of the nut locking the collet was heretofore usually made by means of a mandril or fork wrench inserted into a boring.

It is also well known to provide devices arranged at the tool and comprising movable parts producing the rigid connection between the housing and the spindle. They have as well as the first mentioned means the disadvantage that their handling must be effected with the same hand which simultaneously should strongly maintain the tool. Moreover the protruding of their handling members often interferes with the operation.

The present invention aims to obviate these disadvantages by the provision of a locking device in which balls are maintained within the wall of a sleeve enclosing the spindle head and axially displaceable in the housing against the action of a spring, in such a way that they constantly engage longitudinal grooves of the housing and may be brought into engagement with longitudinal grooves provided in a collar of the spindle head by displacement of the sleeve. Such a locking device neither has parts protruding beyond the diameter of the spindle housing nor does it need any apertures in the spindle housing, through which dirt might enter. Moreover the clamping nut, which lies free in other tools of this kind, may be protected from undesirable contact during operation. The operation may take place by means of the wrench used for releasing and tightening the nut in such a way that one hand remains entirely free for holding the tool.

Other features and advantages of the invention will become apparent from the description now to follow of a preferred embodiment thereof given by way of example and in which reference will be made to the accompanying drawings, in which.

Figure 1:
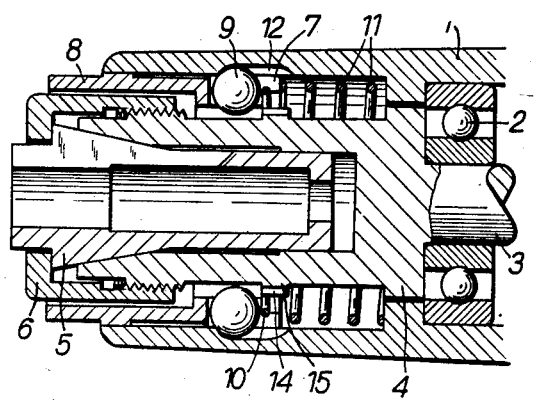
Fig. 1 is a longitudinal section through the spindle housing in rest position.
Figure 2:
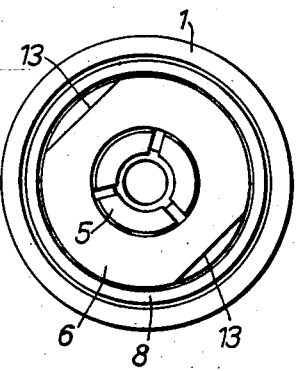
Fig. 2 is a view of the spindle head as seen in direction of the spindle axis.

In the drawings reference numeral 1 designates the housing in which the spindle 3 is arranged on a ball bearing 2. The end 4 of the spindle 3 is formed as a collet chuck adapted to receive a collet 5 held therein by means of a clamping nut 6.

Balls 9 are arranged in borings 7 extending parallelly to the axis of the housing 1 in a sleeve 8 slidable in the housing 1. The diameter of these balls 9 is greater than the wall thickness of the sleeve 8 to such an extent that the balls 9 protrude substantially on both sides beyond the wall of the sleeve. The balls 9 are maintained in the borings 7 by means of a retaining ring 10.

A spring 11 normally forces the sleeve 8 forwardly so far that the balls 9, which are guided in longitudinal grooves 12 of the housing 1, bear against the forward end of said grooves. The nut 6 thereby projects sufficiently beyond the sleeve 8 to permit gripping of the key surfaces 13. In this position the balls 9 are not in contact with the spindle head 4.

For operation a fork wrench is engaged with the key surfaces 13 and, if necessary under slight rotation of nut 6 pressed against the sleeve 8 whereby the latter brings the balls 9 to snap into grooves 14 extending longitudinally in the outer peripheral surface of a collar or annular rim 15 of the spindle head 4, thereby producing a rigid connection between the housing 1 and the spindle 3.

Preferably the number of the grooves 14 is a multiple of the number of balls 9.

Figure 3:
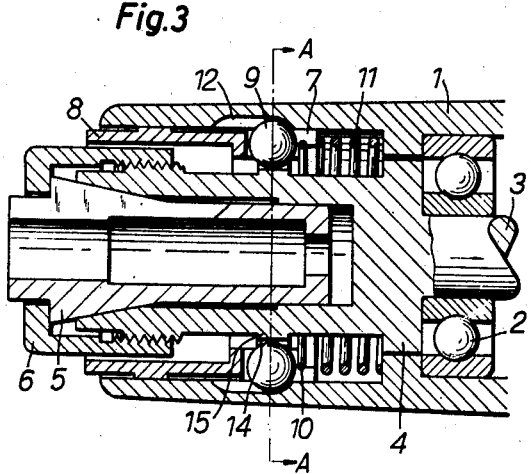
Fig. 3 is a longitudinal section through the spindle housing with the spindle in locked position.
Figure 4:
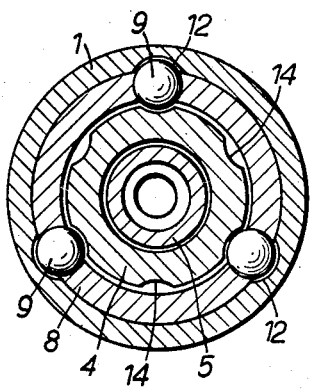
Fig. 4 is a cross-section along the line A—A of Fig. 3.

It will be apparent that normally the spring 11 axially displaces the sleeve 8 to the position of Fig. 1 where the balls 9 are free of the grooves 14 in the rim 15 of spindle head 4 so that the spindle 3 can rotate relative to the housing 1. However, when the nut 6 is engaged by a wrench and the latter is pushed axially on the nut 6 to displace the sleeve 8 toward the right, as viewed in Figs. 1 and 3, with the balls 9 registering with grooves 14 of the rim 15, then the balls 9 enter the grooves 14 and, by reason of their simultaneous engagement with the grooves 12 of the non-rotatable housing 1, the spindle is locked against rotation and the nut 6 can be securely tightened to clamp the collet 5 on a work piece in the latter.

Of course the invention is not restricted to the above-mentioned particular embodiment and for example the balls 9 could also be replaced by rolls.

What I claim is:

1. In combination with a spindle having a collet chuck at an end thereof, a non-rotatable housing accommodating said spindle with said chuck extending out of the housing, means rotatably mounting said spindle within said housing while holding said spindle against axial displacement with respect to said housing, a clamping nut threaded on said spindle and turnable relative to the latter for closing said chuck, an axially movable sleeve interposed radially between said spindle and said housing, spring means acting on said sleeve and urging the latter axially to an inoperative position wherein an end of said sleeve projects axially out of said housing and over said clamping nut, and locking means displaceable with said sleeve in the axial direction and effective to non-rotatably engage both said housing and said spindle only when said sleeve is displaced axially from said inoperative position in the direction opposed to the action of said spring means by the movement of a wrench axially onto said nut, thereby to lock said spindle against rotation with respect to said housing during turning of said nut by a wrench engaged on the latter.

2. The combination as in claim 1, wherein said sleeve has openings therein and said housing has longitudinally extending grooves in its inner surface radially aligned with said openings, said locking means including balls received in said openings of the sleeve and projecting radially outward from the latter to engage in said grooves of the housing, said balls also projecting radially inward from said sleeve; and wherein said spindle has an annular, radially outward directed rim with longitudinally extending grooves in the outer periphery of the rim, said rim being axially disposed on said spindle so that said balls are spaced axially from said rim in said inoperative position of the sleeve and said balls enter said grooves of the rim when said sleeve is displaced axially by a wrench engaged with said nut.

References Cited in the file of this patent

UNITED STATES PATENTS

| | | |
|---|---|---|
| 2,405,772 | Adams | Aug. 13, 1946 |
| 2,618,940 | Wyzenbeek | Nov. 25, 1952 |

FOREIGN PATENTS

| | | |
|---|---|---|
| 874,855 | Germany | Apr. 27, 1953 |